(12) United States Patent
Wong

(10) Patent No.: US 7,547,851 B1
(45) Date of Patent: Jun. 16, 2009

(54) ADVANCED BUTTONLESS SCALE

(75) Inventor: Anson Wong, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 12/131,212

(22) Filed: Jun. 2, 2008

(51) Int. Cl.
*G01G 19/40* (2006.01)
*G01G 19/414* (2006.01)

(52) U.S. Cl. .................................. 177/25.13
(58) Field of Classification Search ... 177/25.13–27.17, 177/25.19; 600/547
See application file for complete search history.

(56) References Cited

U.S. PATENT DOCUMENTS

| | | | |
|---|---|---|---|
| 4,366,873 A | 1/1983 | Levy et al. | |
| 4,576,244 A | 3/1986 | Zeigner et al. | |
| 4,763,739 A * | 8/1988 | Kasinoff | 177/210 R |
| 4,884,199 A * | 11/1989 | Boothroyd et al. | 715/709 |
| 5,254,992 A * | 10/1993 | Keen et al. | 341/119 |
| 5,750,937 A * | 5/1998 | Johnson et al. | 177/25.11 |
| 6,373,237 B1 * | 4/2002 | Oldendorf et al. | 324/105 |
| 6,538,215 B2 * | 3/2003 | Montagnino et al. | 177/25.16 |
| 6,583,369 B2 | 6/2003 | Montagnino et al. | |
| 6,617,530 B1 | 9/2003 | Lin | |
| 6,809,270 B2 | 10/2004 | Fujita | |
| 7,009,119 B2 | 3/2006 | Carlucci et al. | |
| 7,117,031 B2 * | 10/2006 | Lohman et al. | 600/516 |
| 7,186,930 B1 | 3/2007 | Wong et al. | |
| 7,193,163 B1 * | 3/2007 | Kesselman | 177/25.13 |
| 7,265,301 B2 | 9/2007 | Simberg | |

* cited by examiner

*Primary Examiner*—Randy W Gibson
(74) *Attorney, Agent, or Firm*—Lawrence J. Shurupoff

(57) ABSTRACT

A digital scale includes a display and buttonless top platform. Contact with the scale platform alone allows a user to power the scale, identify a user of the scale, determine a mode of operation of the scale, and to establish a reminder. The scale has a first mode of operation displaying a reading of the user's weight. The scale has a second mode of operation providing a display of the user's current weight, a delta or differential weight with the most recent recorded weight measurement and if the data is available, additional deltas for weight measurements taken up to one year earlier. The scale has a third mode of operation in which it provides a reminder for tasks to be undertaken by a user within a specified time.

18 Claims, 8 Drawing Sheets

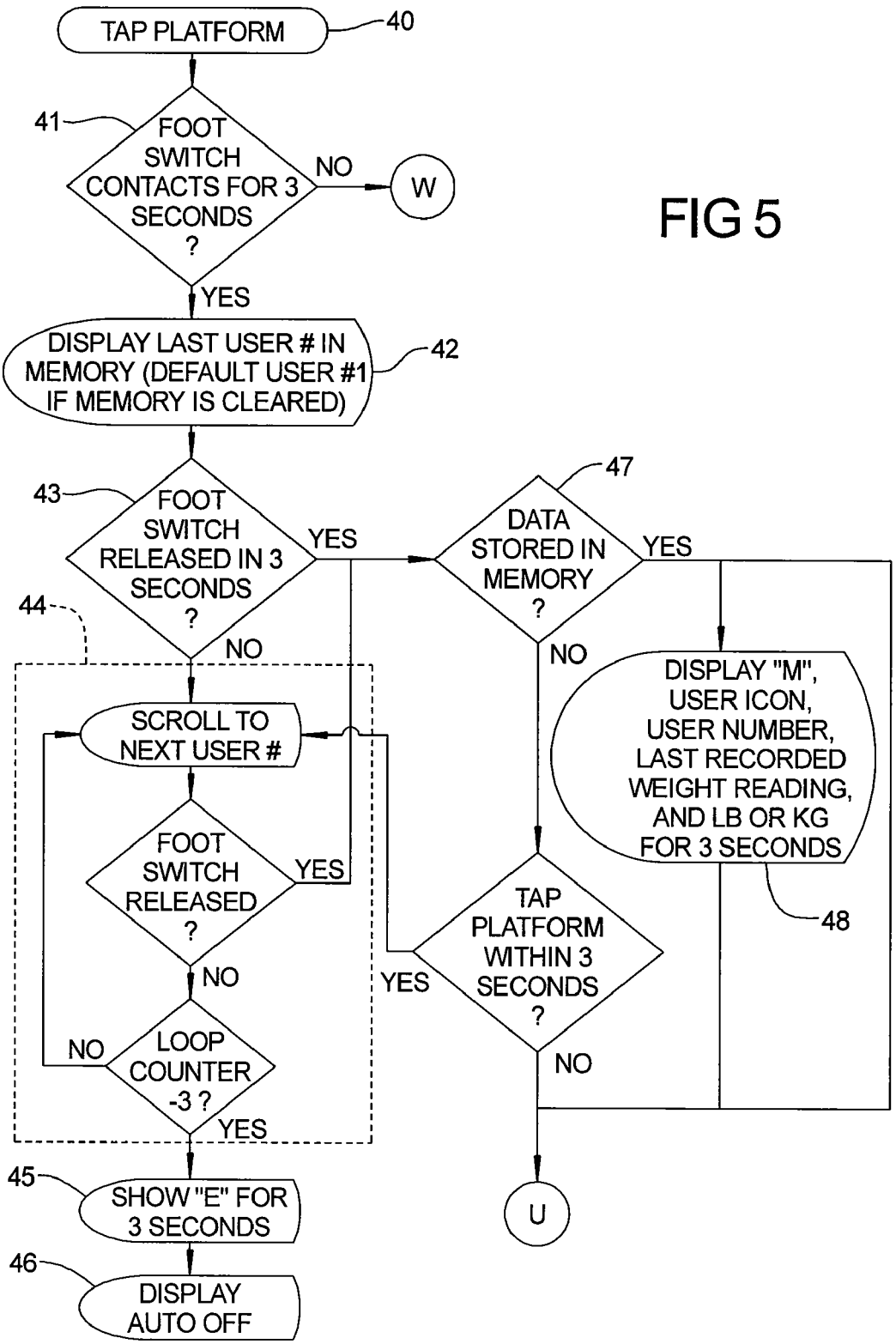

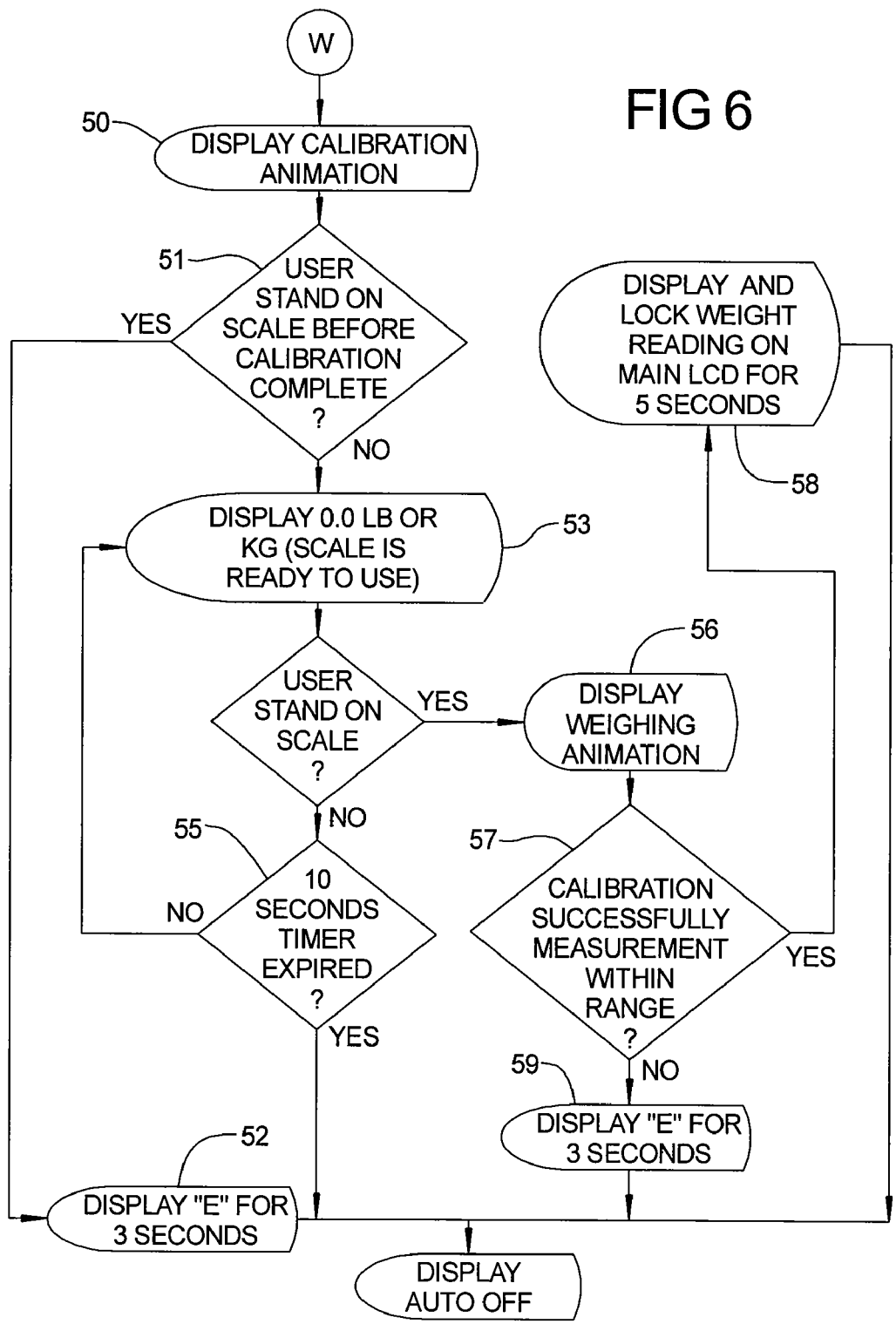

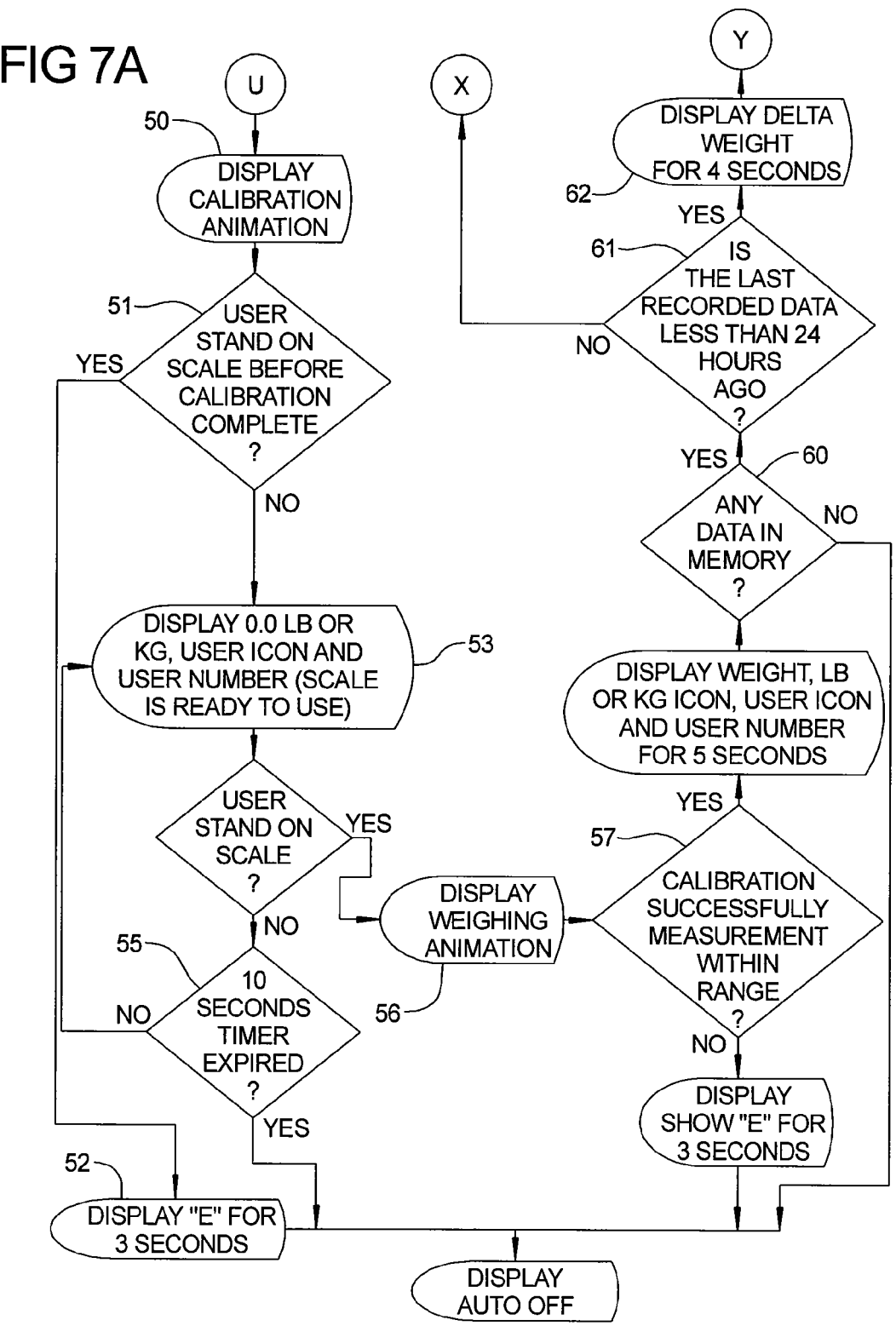

ADVANCED BUTTONLESS SCALE

FIELD OF THE DISCLOSURE

The invention relates in general to a household or bathroom scale with a modular user interface for monitoring body weight. More particularly, the present invention relates to a household or bathroom scale with a variable user interface for a household or bathroom scale having optional automated features including, but not limited to automated individual user setups, weight tracking, time and/or date stamping of such measurements and providing reminders of upcoming medical check-ups or tasks.

BACKGROUND OF THE DISCLOSURE

It is desirable to provide a household scale that is aesthetically pleasing by eliminating buttons on the scale. This improves not only the look of a scale, but also its feel, as a totally smooth surface is presented to one's feet. Similarly, it is desirable to provide a household scale constructed to automate as many features as possible to reduce the actions required of a user to setup and operate the scale. Still further, it is desirable to provide a household scale which allows the user to configure the operation of the scale to include as many or as few of the automated features as the user may desire.

SUMMARY OF THE DISCLOSURE

A household body weight scale includes a display screen and a buttonless top and side platform. A controller is operatively associated with the display screen and the platform. Physical contact with the scale platform alone, rather than through buttons or switches, allows a user of the scale to turn on and power the scale, identify a particular user of the scale, determine a mode of operation of the scale, select features of the scale to activate and whether or not to establish a reminder. Additionally, the scale is constructed to automatically establish an internal time reference for purposes of time stamping weight measurements and for providing reminders of other important tasks to be undertaken by a user. The scale has a first mode of operation providing a reading of the user's weight and if a proceeding measurement is stored in memory, a differential or delta between the proceeding weight measurement taken and the current weight measurement made for a given user. The scale has a second mode of operation providing additional weight differentials between the current weight measurement and if data is available, weight measurements stored from one day to one year earlier. The scale has a third mode of operation in which it serves to provide a reminder for important tasks to be undertaken by a user on a given date. Examples of such tasks could include medical tasks, such as a monthly reminder for a breast self-exam, a six-month reminder for a dental visit or a yearly reminder for a physical or an eye exam. The reminders may also be used for personal or professional tasks, such as a monthly reminder for a hair cut, a yearly reminder for an upcoming vacation or even a three-month reminder to change the oil in a user's car. All of such reminders may be independent of the first or second modes of operation.

The scale may further provide more advanced self-setting features including, by way of example, automated local time and date setting as provided by way of radio interface with the National Institute of Standards and Technology's atomic clock. Still further, using an advanced recognition algorithm, the scale can automatically detect which user is activating the scale so as to avoid having to set the scale to a user number associated with a given user. Still further, the invention may provide an option to initiate multiple reminders for each user of multiple independent tasks, for example an upcoming medical check-up and the user's vacation. Finally, an option is the inclusion of an LCD-type screen that allows for greater flexibility in displaying information to the user, including, by way of example, a graph charting all the recorded weight measurements over a given time period for purposes of providing a visual record of a user's progress during a weight management period.

Other features of the scale will become more apparent to those skilled in the art as the scale is further revealed in the accompanying drawings and detailed description.

BRIEF DESCRIPTION OF THE DRAWINGS

FIG. 5 is an exemplary process flow chart of the process for identifying a user of the scale;

FIG. 6 is an exemplary process flow chart of a first mode of operation of the scale for weighing a designated user and displaying such measured weight;

DETAILED DESCRIPTION

Figure 1:
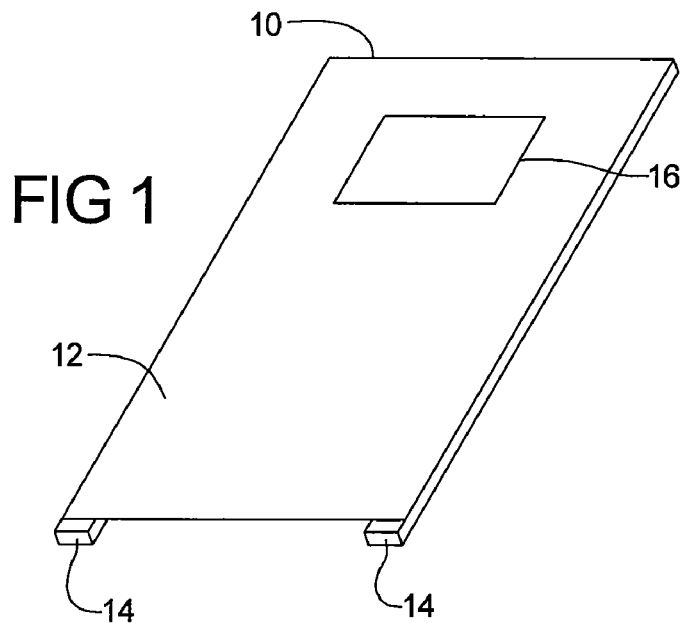
FIG. 1 is an illustration of an exemplary buttonless scale.
Figure 2:
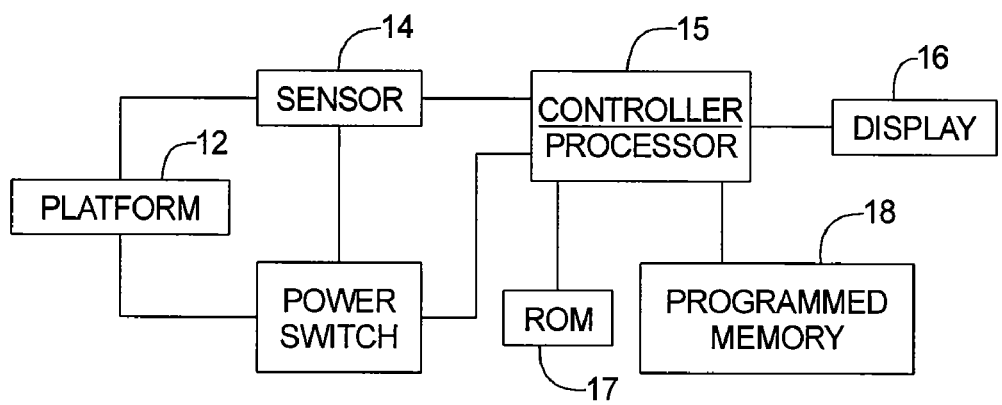
FIG. 2 is a schematic electrical diagram of the scale shown in FIG. 1.
Figure 3:
FIG. 3 is a schematic illustration of an exemplary display arrangement suitable for use in the scale.

Referring to FIGS. 1-3, a digital weight scale 10 has a platform 12 supported on supports 14. Such supports 14 are associated with at least one load cell or sensor for detecting a user's input through the deflection or electrical impulse generated when weight is applied to the platform 12. A display 16 is provided to convey information to a user. All user interaction with the scale 10 is through a series of taps or pushing and holding the platform 12 for a given period of time which provides the user's input to a controller or microprocessor 15. The controller or microprocessor 15 (hereinafter referred to as the controller processor) is operatively connected with the platform 12, display 16, a read only memory 17 and a programmable memory 18. Both the read only memory 17 and programmable memory 18 are preferably a flash-type memory or its equivalent so as not to lose programmed or recorded data upon the loss of electrical power to the scale 10. The programmable memory 18 should be such that it allows a user-initiated clearing of the data to eliminate any stored information.

The scale 10 can be powered by a battery electrical source. The read only memory 17 and the programmable memory 18 can be separate components or joined with the controller processor. The display 16 can be a multiple segment LED display or an LCD display. As best seen in FIG. 3, display 16 can be an LCD with multiple digit/numbers, up and down arrows, English (lb) and metric (kg) weight indicator markings, a user identification number and icon and a calendar icon with a day(s) or week(s) indicator. Additional or replacement markings may be utilized as desired.

Figure 4:
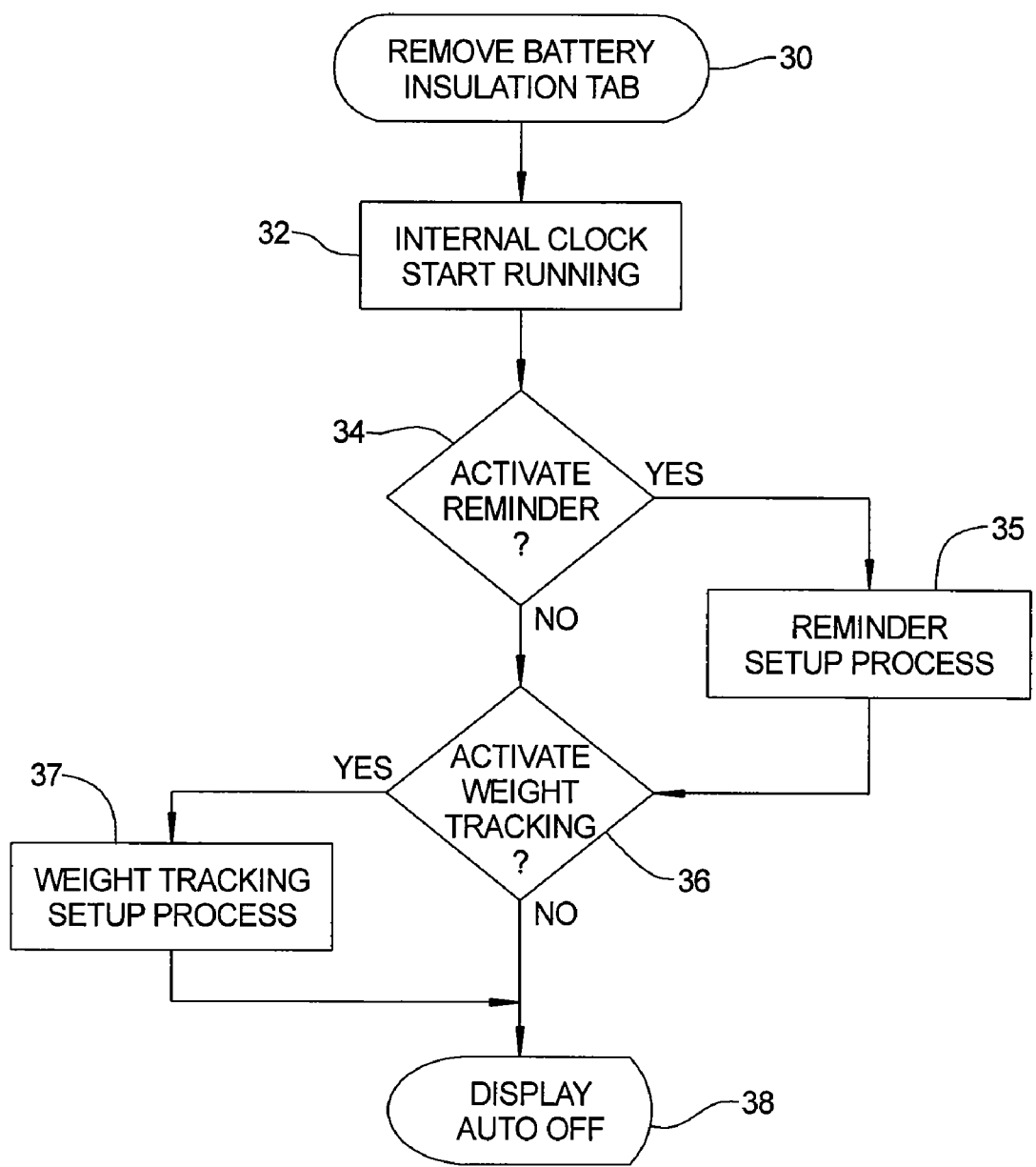
FIG. 4 is an exemplary process flow chart of the initial setup for operation of the scale including the ability for a user to select which mode or modes of operation to activate the scale.

Referring to FIG. 4, beginning with operation 30, a user begins the initial setup of the scale 10 through the removal of the insulation tab covering the battery terminals or alternatively through the insertion of a battery into the scale 10. The introduction of electric power to the scale 10 immediately triggers operation 32, the initiation of the internal clock for purposes of maintaining a running count of time passed since the introduction of electric power to the clock. This internal measurement of time is used to maintain the optional counters for any reminders, as well as for relativistic time-stamping of any recorded weight measurements, which is discussed in more detail below.

Operational Step 34 offers the user the option for establishing a reminder through the use of the scale's internal clock. If activated, the reminder may include any number of optional setup features including by way of example and not limitation, the introduction of a present date and/or time and a desired reminder date. The scale can then remind the user through a visual indicator the number of days or weeks remaining until the date required for action relating to the subject matter associated with the reminder. Alternatively, the reminder process can be simplified to merely provide a 30, 45, 60, or 90 day countdown from the activation of the reminder process. It should be noted that any variation of such a reminder setup process (operational step 35), including but not limited to the use of a user-defined countdown can be utilized with the scale.

Operational step 36 provides the user the ability to select the second mode of operation of the scale 10, the tracking of long-term weight measurements, by tapping the scale platform 12. One exemplary method for tracking of long-term weight measurements is the recordation of each weight measurement for a given period of time. One such period for recording weight measurements may include data for the proceeding one-year period. Alternatively, the data may be limited to the proceeding three months. Regardless of the period over which to maintain data, the limit is not based on the user interface but the size of the available memory storage and the number of measurements to be stored. As with the reminder process setup (operational step 35), the selection of the second mode of operation for the scale 10 and its setup, as indicated by operational step 37, may include the selection of the period of time over which to maintain data based on available memory storage and/or the frequency of such maintained data (daily, weekly, monthly, etc.). Additional options with regard to the measured and stored data may also be implemented into the operations of the scale 10. Upon completion of the scale setup the scale is intended to turn itself off automatically as indicated in operational step 38.

As shown in FIG. 5, in order to fully utilize the optional features of the scale 10 each individual user need identify themselves through the use of a corresponding user identifying number. In operation 40, a user of the scale 10 uses their foot to contact the scale platform 12 by pressing and holding it in proximity to one of the load cell(s) or sensor(s) thereby causing the scale 10 to be powered on. Unless the programmable memory has been cleared, the display in operation 42 indicates the last user to utilize the scale 10 by display of the user icon and the user number. If the programmable memory has been cleared the display 16 will display the user icon and default to user number one. If the user number displayed is incorrect, the user need merely to hold the scale platform 12 down to have the scale 10 scroll through the user numbers as in operation 44 until the scale platform 12 is released as in operation 43. The scale may be designed to limit the number of times it will scroll through the potential user number listing before it indicates an error through the display of "E" and automatically turns itself off as indicated in operation steps 45 and 46. Alternatively, the scale may allow the user to scroll through the potential user number listing as many times as is desired.

Once the scale platform 12 has been released as in operation 43, the scale 10 in operational step 47 will check for any data stored in memory that is associated with the selected user number. If there is any such data, the scale 10 proceeds to display the last recorded weight measurement associated with that user for a predefined period of time, as in operation 48. At the termination of the previous weight measurement display, the scale 10 transitions immediately to the user selected mode of operation. If, however, at any point during the display of such prior weight measurement or should there be no previous measurement data associated with the identified user, by tapping the platform as in operational step 49 the user can return to operational step 44 and continue to scroll through the available users.

Should the scale 10 be setup for a single user or should a user desire to skip the user identification steps discussed above for the purpose of proceeding to the weighing process, such transition can be achieved by releasing the load cell or sensor after initiation of the scale's power up within the predefined time period as shown in operational step 41. The scale 10 will automatically transition to the first mode of operation and will proceed as explained in more detail below.

If a user has bypassed the user identification process as discussed above with regard to operational step 41 or has set the scale 10 for operation under the first mode, the measurement of the user's weight and display of same, upon release of the load cell or sensor (operational step 41) or alternatively, upon completion of the display of the last weight measurement (operational step 48) or the determination that no stored weight measurement data was available for display, the scale 10 will proceed to operational step 50. Operational step 50 represents the internal calibration process undertaken by the scale to ensure that any potential error introduced to the scale measurement has been accounted for or removed so as to provide as accurate a measurement as possible. During such calibration process and for purposes of indicating such activity to the user, the middle horizontal segments of each of the main seven-segment display will blink followed by the lower horizontal segments of each of the main seven-segment display and finally the upper horizontal segments of each of the main seven-segment display giving the impression of a single three-segmented horizontal line scrolling down the display 16.

In operation 53, after the scale 10 has been successfully calibrated, the display 16 will show "0.0" to indicate to the user that the scale 10 is ready for use. If the user should step on the scale 10 before calibration is complete, as determined in operation step 51, the display will show an error message "E" (operational step 52). The scale will then proceed to automatically shutoff. After display of an indication that the scale 10 is properly calibrated as in operational step 53, the user is provided a predetermined period of time to stand on the scale 10 as timed in operation 55. Should the user fail to stand upon the scale 10 within the allotted time period, the scale 10 will proceed to automatically shut itself off. If, however, the user steps on the scale within the allotted time period, the display 16 will depict an animation comprising three "bubbles"—the upper half of the first element of the main seven-segment display, the lower half of the second element of the main seven-segment display and finally, the upper half of the third element of the main seven-segment display. The display 16 will alternatively display each of such elements with their opposing element halves to give the impression of three individual columns of alternating "bubbles" as represented by operation 56. Such animation is the weighing animation and is displayed during each weight measurement activity (operational step 56).

Typically, the scale 10 has a range of weights between 10 lb and 400 lb wherein the scale measures the weight of the user accurately. If the weight measurement of the user is within the limits of accurate scale usage as determined in operation 57, the display 16 will indicate the weight measurement as specified in operation 58. The display of the weight reading occurs for a predetermined time. If in operation 57 the weight measurement is outside of the bounds of accurate weight measurement of the scale 10, the display 16 displays an "E" (operational step 59) for a period of time. At the conclusion of the operational step 59, the controller processor commands the power switch and display 16 to shut off.

Figure 7B:
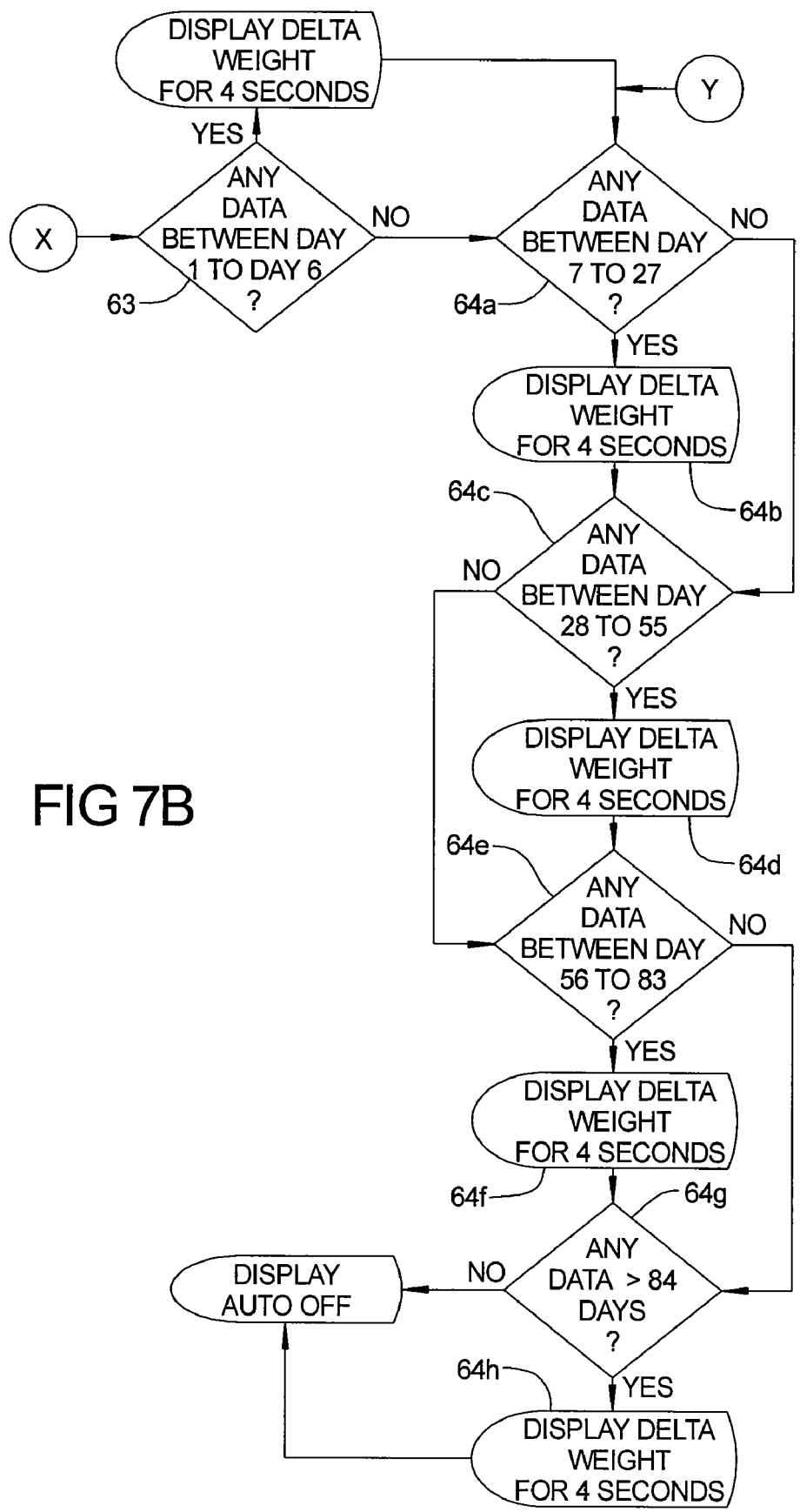
FIG. 7 is an exemplary process flow chart of a second mode of operation of the scale for weighing a designated user, displaying a delta weight between the current and immediately proceeding measurement for the user and displaying additional delta weights using additional earlier measurements.

If the user has set the scale 10 to operate in the second mode of operation—wherein the user's weight and the deltas between the current measurement and multiple earlier weight measurements are provided, as depicted in FIG. 7 operation of the scale is identical to that described above for FIG. 6 through operational step 57. After depiction of the present weight measurement, as in operational step 60 the scale 10 determines if there are any earlier weight measurements with which to calculate a delta (operational step 61). While the scale may be programmed to provide a displayed delta weight with any or all available data points, in one exemplary embodiment the scale 10 can be programmed to provide such deltas as the delta between the current weight measurement and the immediately proceeding weight measurement and the deltas between the current weight measurement and those measurements that most closely occur in time to four, eight, twelve weeks and earlier. With each displayed delta, the scale 10 will also display the calendar icon and a representative number and identifier ("X" number of "DAYS" or "WEEKS AGO") indicating with which earlier measurement the displayed delta corresponds. If no earlier weight measurement data is available, no delta will be displayed.

In order to determine the most appropriate measurements to use for calculation of a delta in the exemplary embodiment the scale uses a time-stamping technique which matches each measurement with a corresponding "relative time" stamp. "Relative time" is the controller processor's method for tracking the total number of days the scale 10 has been operative since the removal of the battery insulation tab during the initial setup. Within such "relative time" each 24 hours equals one day and determination of the interval in time between any two measurements is simply the difference between the "relative" times associated with each measurement. The concept of the "relative time" and its use in a third mode of operation will be discussed in more detail below.

As in operational step 61, the scale 10 determines whether the most recently recorded measurement was at least 24 hours earlier. If such measurement was within the last 24 hours (i.e., the difference between the present "relative time" and that associated with the most recent measurement equals 0), the delta weight will still be shown, as in operational step 62, however the calendar icon and any representative number of "DAYS" will not be shown on the display 16. If such measurement is more than 24 hours ago but less than 7 days as determined in operational step 63, the delta weight measurement will be displayed. Additionally, the calendar icon, the number of days since such measurement and the "DAY" or "DAYS" indicator will be displayed. In the present exemplary embodiment, as with the determination of the most recent measurement, in operational steps 64a through 64h the scale will evaluate the stored weight measurements for the identified user for measurements most closely associated in "relative time" to 27, 55 and 83 days (i.e., 4, 8 and 12 weeks ago). Each of such available measurements will have their deltas as compared to the present weight measurement displayed along with the corresponding number of weeks since such earlier measurement along with the calendar icon and an indicator of "WEEKS AGO." It should be noted that the scale can be programmed to provide a single or multiple deltas as described above. Further, such deltas may be shown for every stored measurement or any pre-selected measurements such as 1, 2, 3, etc. months.

Figure 8:
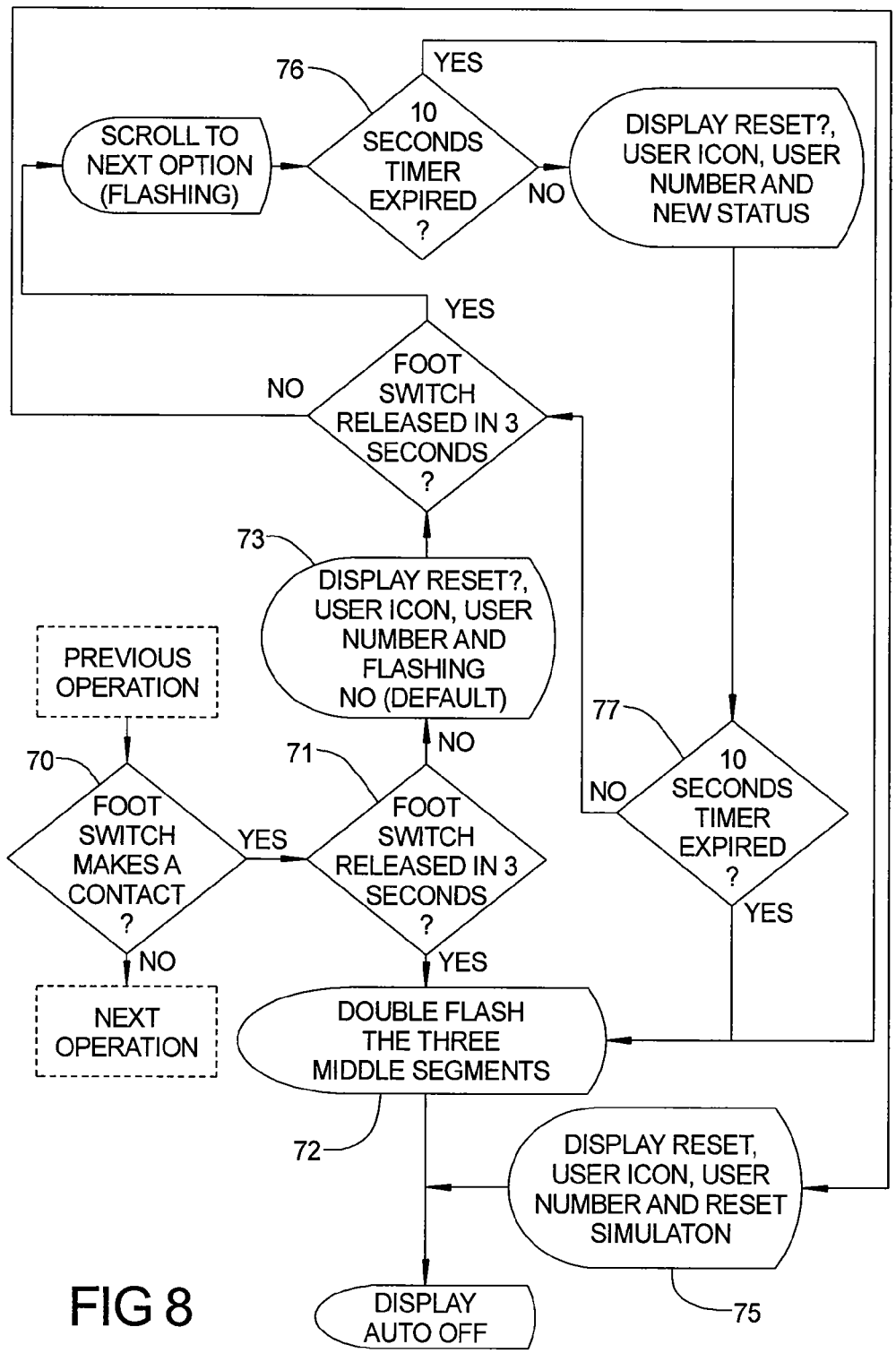
FIG. 8 is an exemplary process flow chart for clearing any stored data for a given user.
Figure 9:
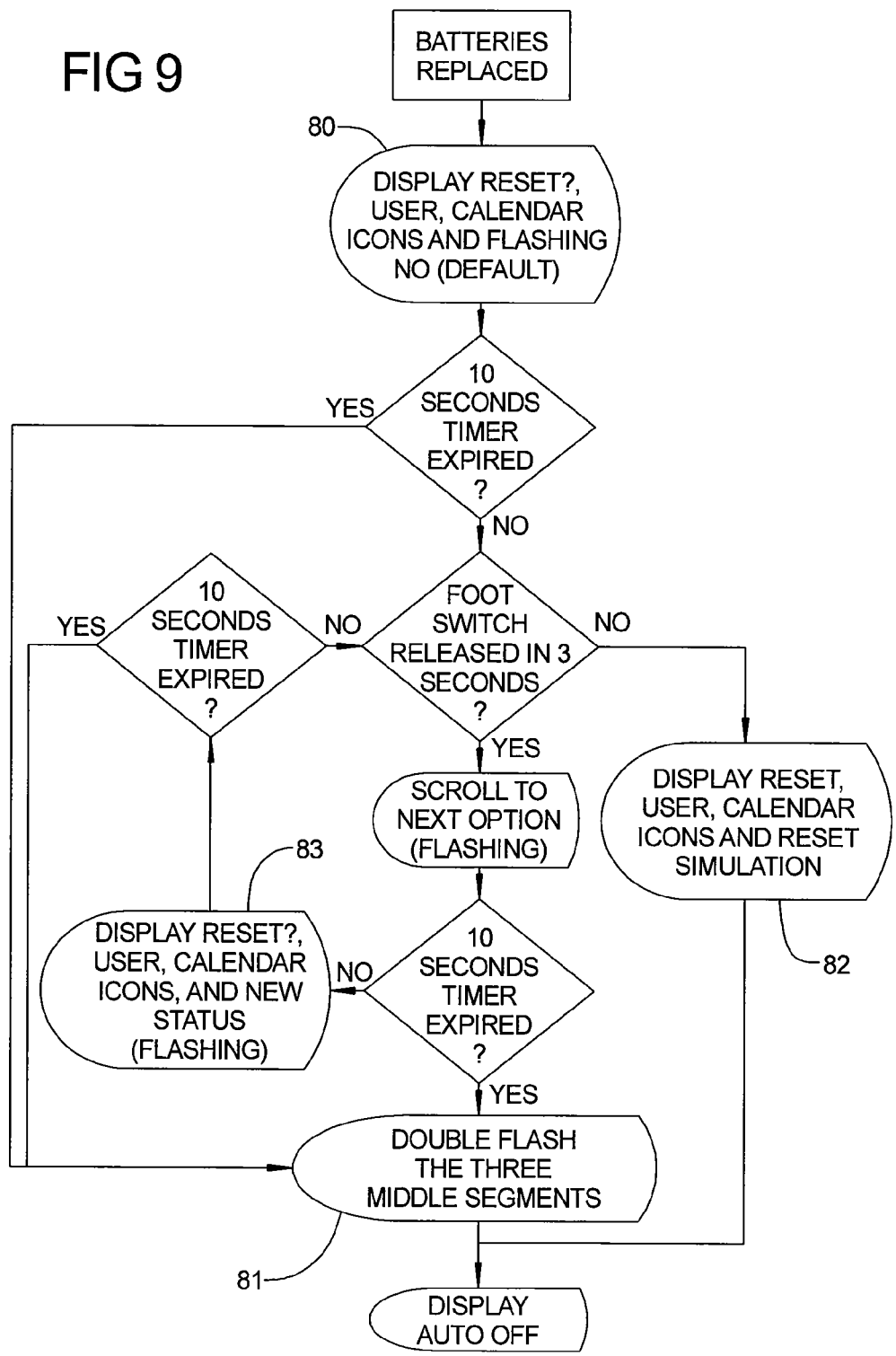
FIG. 9 is an exemplary process flow chart for optionally clearing any stored data upon a battery replacement.

At any point during operation of the scale 10 a user may wish to reset or clear the stored weight measurement data effectively restarting the recordation of data for a given user. As shown in FIG. 8, in one exemplary embodiment a user may "reset" the data associated with an identified user immediately following a weight measurement operation by simply activating the scale at or near a load cell or sensor as indicated in operational step 70. Should such activation of the platform 12 be in error, the release of the platform within a specified period of time as determined in operational step 71 will result in the double flash of the three middle horizontal segments of the main seven-segment displays (operational step 72) and the auto shutoff of the scale 10. Should the user fail to release the load cell or sensor within the defined time period, as in operational step 73, the display will indicate the query "RESET?", the user number and icon and default to an entry of "NO" in the main seven-segment displays. Again if the activation of the reset process was unintended or if the user number displayed is incorrect, after the appearance of "RESET?" on the display, the user need merely release the load cell or sensor within an additional predefined time period. The determination of whether or not the user has timely released the foot switch is made in operational step 74.

If the user intends to reset (i.e., clear the stored weight measurements) the scale 10 for a given user and the user indicated on the screen is correct, the user need merely maintain the activation of the load cell or sensor for a predefined period of time as determined in operational step 74 and the scale will reset for that user and indicate such on the display 16 by indicating the word "RESET", the user number, and the user icon. During the reset process the display will additionally indicate its action through display of the reset animation which is the flashing of all horizontal elements of each of the main seven-segment display (operational step 75).

Where activation of the reset process was unintentional or where the displayed user number is incorrect and needs to be changed the user can release the load cell or sensor within the predefined time as determined in operational step 74. This will enter the user into a portion of the user interface that allows them to tap the scale platform each time they need to scroll to the next user, provided again that it is within a predefined period of time (operational step 76). Should the user release the load cell or sensor within the measured time period and not tap and hold the sensor again, the scale will recognize the user's decision not to reset anything and as defined in operational step 72 will flash the middle horizontal element of each of the main seven-segment displays to indicate no reset has taken place. The scale will then proceed to turn itself off.

In those situations in which the user is merely changing the user number so as to then proceed with a reset process, the user may tap the scale platform until the desired user number and icon is displayed. By then tapping the load cell or sensor once to indicate the desire to activate the reset (as in operational step 77) and then pressing and holding the load cell or sensor again to confirm such election (as determined in operational step 74), the scale 10 will undertake the actions of operational step 75 in resetting the data for the displayed user while indicating such by display of the reset animation. As best seen in FIG. 2, physical contact between the user and the platform 12 triggers sensor 14 to transmit an electrical signal indicative of a force to controller processor 15. Controller processor 15 coordinates the interaction between the signals from the sensor 14, the read only memory 17, the programmable memory 18 and the display 16 for determining the appropriate stored weight measurements, the calculation of the deltas and their display. After completion of the preprogrammed display of the deltas between the current weight measurement and historical weight measurements the scale will then proceed to an auto off.

Finally, the scale will occasionally require a replacement of the power source (i.e., the batteries). During such operation, the user will be provided the opportunity to reset the calendar reminder, as well as any data that have been previously measured for a given user. As such, in operational step 80, upon recognition that the batteries have been replaced (and recognized as not being the initial removal of the tab covering the battery terminals), the scale displays a "RESET?" query along with a specific user number, the calendar icon and a flashing "NO" as a default. If the user wishes to merely delete the recorded weight measurement data for the displayed user, activating and holding for a predetermined period of time the scale platform will cause the display to change so as to indicate "RESET" and acknowledge its activity through the display of the reset simulation as in operational step 82.

Where a user desires to change the user number or the calendar reminder, by tapping the scale 10 twice, the display 16 will scroll to the next available option be it a new user number or an indication that the calendar timer has been reset to zero. The user may scroll through such options until they locate the configuration they desire by continuing to tap the scale platform until the displayed information (user number and/or calendar icon) accord with the desired change as indicated in operational step 83. Once the display indicates the desired configuration by pressing and holding the scale platform, the scale 10 will proceed as indicated in operational step 82 to reset the scale/data/etc. as instructed. If no configuration is available that satisfies the user, by holding the scale platform activation the scale will revert to operational step 81 so as to indicate that no reset is to take place by way of showing the double flash of the middle horizontal element of each of the main seven-segment displays.

While a preferred embodiment of the scale has been disclosed, it is to be understood it has been described by way of example only, and various modifications can be made without departing from the spirit and scope of the Disclosure as it is encompassed in the following claims.

The invention claimed is:
1. A digital scale comprising:
a display;
a buttonless top platform;
a controller operatively associated with said display and said top platform wherein physical contact with said platform activates said scale, determines a mode of operation from among a plurality of independent modes of operation and identifies a user of said scale;
a memory for storage of measured weight values; and
wherein said controller comprises a clock for generating a relative date-stamp for each of said stored measured weight values based on the period of time that has passed since the initial application of electrical energy to said scale.

2. The scale of claim 1, wherein a first mode of operation measures and displays a user's weight.

3. The scale of claim 1, wherein a second mode of operation measures and displays at least a user's current weight and a delta weight value between the user's current weight and a most recently stored measured weight value.

4. The scale of claim 3, wherein said second mode of operation additionally displays any delta weight values between the user's current weight and the stored measured weight values most closely aligned with four, eight and twelve weeks earlier, selection of the most appropriate stored measured weight values being based on the relativistic date-stamp associated with each stored measured weight value.

5. The scale of claim 4, wherein said display includes a combination numerical and textual indication of the relativistic time period between the current measured weight value and said delta weight values.

6. The scale of claim 3, wherein said display provides a visual positive/negative indicator of the delta weight value relative to said current measured weight value.

7. The scale of claim 1, wherein a third mode of operation functions to provide said user a reminder of an important event or task.

8. The scale of claim 7, wherein either one of said first or said second modes of operation may simultaneously function during the performance of the third mode of operation.

9. The scale of claim 1, wherein said display is a multi-segment LED or LCD display.

10. The scale of claim 1, wherein said scale has a plurality of display animations indicative of the operation said scale is performing.

11. The scale of claim 10, wherein said individual display animations include indications for an error, the calibration of the scale, the measurement of a weight value, and the reset of data for a given user.

12. A method of using a digital scale comprising a display, a buttonless top platform, a controller operatively associated with said display and said top platform wherein physical contact with said platform allows a user of said scale to activate said scale, determine a mode of operation of said scale and identify a user of said scale, a memory for storage of measured weight values, and wherein said controller comprises a clock for generating a relativistic date-stamp for each of said stored measured weight values based on the period of time that has passed since the initial application of electrical energy to said scale, said method comprising:
physically contacting said platform to power on said scale and to determine said operating mode of said scale;
using said platform to identify said user of said scale;
displaying a current measured weight value in a first mode of operation or displaying a current measured weight value and at least a delta weight value between the current measured weight value and the most recently stored measured weight value in a second mode of operation; and
automatically powering off said scale after said reading is displayed.

13. The method of claim 12, wherein said a first mode of operation functions to measure and display a user's weight.

14. The method of claim 12, wherein said second mode of operation additionally displays any delta weight values between the user's current weight and the stored measured weight values most closely aligned with four, eight and twelve weeks earlier, selection of the most appropriate stored measured weight values being based on the relativistic date-stamp associated with each stored measured weight value.

15. The method of claim 14, further comprising the step of displaying a combination numerical and textual indication of the relativistic time period between the current measured weight value and said delta weight values.

16. The method of claim 12, wherein said second mode of operation further comprises the step of displaying a visual positive/negative indicator of the delta weight value relative to said current measured weight value.

17. A digital scale comprising:
a display;
a buttonless top platform;
a controller operatively associated with said display and said top platform wherein physical contact with said platform allows a user of said scale to activate said scale, determine a mode of operation from among a plurality of independent modes of operation and identify a user of said scale;
a memory for storage of measured weight values, wherein said memory may be reset on a user-by-user basis through physical contact with said top platform; and
wherein said controller comprises a clock for generating a relative date-stamp for each of said stored measured weight values based on the period of time that has passed since the initial application of electrical energy to said scale.

18. The scale of claim 17, wherein said scale has a plurality of display animations indicative of the operation said scale is performing.

* * * * *